US010056769B2

(12) United States Patent
Qu

(10) Patent No.: US 10,056,769 B2
(45) Date of Patent: Aug. 21, 2018

(54) LITHIUM-ION BATTERY PROTECTOR

(71) Applicant: SINONEWENERGY (SUZHOU) TECHNOLOGY CO., LTD., Suzhou (CN)

(72) Inventor: Honggui Qu, Beijing (CN)

(73) Assignee: SINONEWENERGY (SUZHOU) TECHNOLOGY CO., LTD., Wuzhong District Suzhou Jiangsu Province (CN)

( * ) Notice: Subject to any disclaimer, the term of this patent is extended or adjusted under 35 U.S.C. 154(b) by 103 days.

(21) Appl. No.: 15/106,509

(22) PCT Filed: Jul. 8, 2014

(86) PCT No.: PCT/CN2014/081839
§ 371 (c)(1),
(2) Date: Jun. 20, 2016

(87) PCT Pub. No.: WO2015/090047
PCT Pub. Date: Jun. 25, 2015

(65) Prior Publication Data
US 2017/0033576 A1    Feb. 2, 2017

(30) Foreign Application Priority Data

Dec. 20, 2013  (CN) .......................... 2013 1 0711405
Dec. 20, 2013  (CN) ..................... 2013 2 0850456 U

(51) Int. Cl.
*H02J 7/00*     (2006.01)
*H01M 2/00*     (2006.01)
(Continued)

(52) U.S. Cl.
CPC ....... *H02J 7/0029* (2013.01); *H01H 61/0107* (2013.01); *H01M 2/34* (2013.01);
(Continued)

(58) Field of Classification Search
CPC .... H02J 7/0029; H02J 7/007; H01H 61/0107; H01M 2/34; H01M 2/348; H01M 10/0525; H01M 10/44; H01M 10/443; H02H 7/18
See application file for complete search history.

(56) References Cited

U.S. PATENT DOCUMENTS 4,035,552 A * 7/1977 Epstein .................... H01M 2/34
                                                              429/58
5,376,467 A * 12/1994 Abe ..................... H01M 2/1241
                                                             429/163
(Continued)

FOREIGN PATENT DOCUMENTS

CN    101449342 A    6/2009
CN    101595546 A    12/2009
(Continued)

OTHER PUBLICATIONS

Supplemental European Search Report dated Jul. 5, 2017 for EPO Patent Application 14871473.
(Continued)

*Primary Examiner* — Stacy Whitmore

(57) ABSTRACT

The present invention discloses a lithium-ion battery protector, comprising a broken-circuit protection switch arranged in a charging loop of a lithium-ion battery pack, wherein the broken-circuit protection switch is adapted to carry out the switching-on or switching-off of the charging loop of the lithium-ion battery pack via the shape change of a shape memory alloy therein at different temperatures. The lithium-ion battery protector uses the memorability, interference resistance, high voltage resistance and passive overcurrent capacity of the shape memory alloy.

13 Claims, 3 Drawing Sheets

(51) Int. Cl.
*H01M 10/00* (2006.01)
*H02H 7/18* (2006.01)
*H01M 2/34* (2006.01)
*H01M 10/44* (2006.01)
*H01H 61/01* (2006.01)
*H01M 10/0525* (2010.01)
*H01M 10/052* (2010.01)
*H01H 37/32* (2006.01)

(52) U.S. Cl.
CPC ....... *H01M 2/348* (2013.01); *H01M 10/0525* (2013.01); *H01M 10/44* (2013.01); *H01M 10/443* (2013.01); *H02H 7/18* (2013.01); *H02J 7/007* (2013.01); *H01H 37/323* (2013.01); *H01M 10/052* (2013.01); *H01M 2200/00* (2013.01); *H01M 2200/10* (2013.01)

(56) References Cited

U.S. PATENT DOCUMENTS

| | | | | |
|---|---|---|---|---|
| 6,005,469 A | * | 12/1999 | Kalapodis | H01H 37/043 337/139 |
| 6,069,551 A | * | 5/2000 | Kalapodis | H01H 37/043 337/139 |
| 6,140,903 A | * | 10/2000 | Kalapodis | H01H 37/323 337/14 |
| 6,179,699 B1 | * | 1/2001 | Costa | B24B 37/04 451/288 |
| 6,294,977 B1 | * | 9/2001 | Kalapodis | H01H 37/043 337/139 |
| 6,570,749 B1 | * | 5/2003 | Ling | H01H 37/323 337/140 |
| 2007/0257023 A1 | * | 11/2007 | Watanabe | H01L 21/67103 219/444.1 |
| 2008/0116851 A1 | * | 5/2008 | Mori | H01M 2/34 320/134 |
| 2009/0194519 A1 | * | 8/2009 | Funaki | F23Q 7/001 219/270 |
| 2014/0027441 A1 | * | 1/2014 | Mine | H05B 3/02 219/538 |
| 2017/0102653 A1 | * | 4/2017 | Yoshioka | G03G 15/2078 |

FOREIGN PATENT DOCUMENTS

| | | | |
|---|---|---|---|
| CN | 101894693 A | 11/2010 | |
| CN | 102483046 A | 5/2012 | |
| CN | 103177835 A | 6/2013 | |
| CN | 103985834 A | 8/2014 | |
| JP | 59191273 A | * 10/1984 | ............. H01M 2/34 |
| JP | H07045356 A | 2/1995 | |
| JP | 1998-162703 A | 6/1998 | |
| JP | 2006304486 A | 11/2006 | |
| JP | 2006338927 A | 12/2006 | |
| WO | 2007132808 A1 | 11/2007 | |

OTHER PUBLICATIONS

International Search Report dated Oct. 13, 2014 for PCT/CN2014/081839 filed Jul. 8, 2014.

* cited by examiner

LITHIUM-ION BATTERY PROTECTOR

CROSS-REFERENCE TO RELATED APPLICATIONS

The present application is the U.S. National Phase entry of International App. No. PCT/CN2014/081839 filed Jul. 8, 2014, titled "Lithium-Ion Battery Protector", which claims priority to Chinese Pat. App. 201310711405.1 filed Dec. 20, 2013, titled "Lithium-Ion Battery Protector" and Chinese Pat. App. 201320850456.8 filed Dec. 20, 2013, titled "Lithium-Ion Batter Protector," the entirety of which applications are incorporated by reference herein.

FIELD OF THE INVENTION

The present invention relates to a battery protection technology, and particularly relates to a lithium-ion battery protector.

BACKGROUND OF THE INVENTION

At present, power lithium-ion batteries are increasingly widely applied to various devices, including automobiles, uninterruptible power supplies (UPSs), power energy storage, field electricity utilization, etc. The lithium-ion batteries become the mainstream of the present battery market due to the advantages of high capacity and small size. However, the lithium-ion batteries are prone to being sharply heated up under the abnormal conditions of short circuit, over-charging and the like, and serious accidents such as explosion, combustion and the like may happen in the absence of protection measures. Thus, the lithium-ion batteries must be forcibly provided with over-voltage, over-temperature and over-current protection devices. In other words, one of the main technical problems of replacing the traditional lead-acid batteries with secondary lithium-ion batteries is to install protection circuits for over-current, over-charging, over-discharging and the like for the secondary lithium-ion batteries, so as to ensure safe operation of the batteries.

In the application fields of mobile phones, electric tools and the like, dedicated circuits are mainly adopted for detecting relevant parameters of batteries at present such as voltage, charging/discharging current and the like. When these parameters exceed the limited values, the charging/discharging loops of the batteries are cut off by switching off such switching devices as relays, metal-oxide-semiconductor field-effect transistors (MOSFETs), insulated-gate bipolar transistors (IGBTs), and the like, and the batteries stop charging/discharging, so that safe operation of the batteries is ensured. Although switching off such switching devices as relays, MOSFETs and the like is flexible and quick, the overall reliability of systems is low due to the complexity of peripheral control and drive circuits; in addition, the semiconductor devices, such as MOSFETs, IGBTs and the like, have the problems of poor interference resistance, poor current impact resistance and the like; and the relays have the defects of slow operation, high drive current, huge size and the like.

Moreover, in the forming process of an existing lithium-ion battery pack, many control points are needed, and when power lithium-ion batteries are used in series and in parallel, the management is very complex, and the cost of a protection system in a battery pack system always constitutes more than half of the overall cost. On the other hand, the present electronic semiconductor switches (e.g. MOSFETs) have the defects of short service life, poor stability, poor heat resistance, weak interference resistance, weak high voltage resistance and the like.

A certain number of battery cores must be connected in series and in parallel to achieve the required voltage and capacity in the application fields of electric tools, electric bicycles, small energy storage and the like, but the defects of the above switching devices such as relays, MOSFETs, IGBTs and the like greatly limit the application of the battery cores in these fields.

Therefore, it is extremely important to design and manufacture a controllable switch assembly which is simple in peripheral control circuit and stable and reliable in operation, has over-current resistance and can be connected in series and in parallel within a certain range in the application fields of electric tools, electric bicycles, small energy storage and the like.

SUMMARY OF THE INVENTION

The present invention aims to provide a lithium-ion battery protector, which can simplify a peripheral control circuit and improve the reliability, interference resistance, voltage resistance, over-current resistance and comprehensive thermal management capability.

In order to fulfill the above technical aim, the present invention is realized by the following technical solution.

A lithium-ion battery protector includes a broken-circuit protection switch arranged in a charging loop of a lithium-ion battery pack, wherein the broken-circuit protection switch is adapted to carry out the switching-on or switching-off of the charging loop of the lithium-ion battery pack via the shape change of a shape memory alloy therein at different temperatures.

Further, the broken-circuit protection switch includes a movable contact end and a static contact end, the movable contact end is made of the shape memory alloy and is in contact with the static contact end to conduct power in the charging loop at low-temperature shape, and when it comes to the memory temperature, the movable contact end restores the high-temperature shape and is disengaged from the static contact end to cut off power in the charging loop.

Further, the broken-circuit protection switch includes a movable contact end, a static contact end and an elastic sheet, the elastic sheet is made of the shape memory alloy, the elastic sheet extends the movable contact end to the static contact end at low-temperature shape so that the movable contact end is in contact with the static contact end to conduct power in the charging loop, and when it comes to the memory temperature, the elastic sheet restores the high-temperature shape, and the movable contact end is restored and disengaged from the static contact end to cut off power in the charging loop.

Further, the surfaces of both the movable contact end and the static contact end are silvered.

Further, the lithium-ion battery protector further includes a monitoring and electro-thermal control circuit and a heater which is arranged on one side of the broken-circuit protection switch, and the monitoring and electro-thermal control circuit is electrically connected with the heater to monitor the lithium-ion battery pack and control the heater for heating the broken-circuit protection switch (10) according to the monitoring condition.

Further, the monitoring and electro-thermal control circuit is adapted to, when monitoring a parameter for breakage protection of the lithium-ion battery pack, control the heater to heat, so that the broken-circuit protection switch comes to the memory temperature.

Further, the monitoring and electro-thermal control circuit is specifically adapted to, when monitoring a parameter for breakage protection of the lithium-ion battery pack, initiate the heater to heat the broken-circuit protection switch by using a battery core with relatively high voltage in the lithium-ion battery pack, so that the broken-circuit protection switch comes to the memory temperature.

Further, the lithium-ion battery protector further includes an aluminum base, the broken-circuit protection switch is provided on the base, and the heater is arranged below the base.

Further, the lithium-ion battery protector further includes a shell, and the broken-circuit protection switch, the base, the heater and the monitoring and electro-thermal control circuit are all arranged in the shell.

Further, the heater is a ceramic heater including a primary ceramic heater positive temperature coefficient (PTC) and an auxiliary ceramic heater negative temperature coefficient (NTC), and the primary ceramic heater PTC cooperates with the auxiliary ceramic heater NTC to keep a substantially constant ampere-level load.

The present invention has the following advantages.

1. The complex protection system of a lithium-ion battery is simplified by using the memorability, interference resistance, high voltage resistance and passive over-current capacity of the shape memory alloy; and the battery is modularized to overcome the existing defects of short service life, poor stability, weak interference resistance, weak high voltage resistance, poor over-current resistance and the like of an electronic semiconductor switch (e.g. MOSFET). The problem of safety of the lithium-ion battery is effectively solved.

2. The metal structure with weak impedance directly acts on the lithium-ion battery module with limited voltage, so that random series-parallel connection usage under the lithium-ion battery module is really carried out. Safety and usage simplicity are combined into a whole.

3. The surface silvered structure is adopted to carry out arc extinction, thus ensuring effective breakage under the high current condition in the deformation process.

4. The physical on-off function carried out by the shape memory alloy is combined with the balance function of the lithium-ion battery; when the shape memory alloy is triggered, low current needs to be output from the battery; and a current trigger mechanism arranged in the monitoring and electro-thermal control circuit can output the current in the battery core with highest voltage in the lithium-ion battery pack first, so that the problem of consistency deviation of the battery is actively solved.

5. The cost of the present power lithium-ion battery pack system constitutes more than 50% of the overall cost, and the existing cost of the power lithium-ion battery pack system can be directly reduced by over 40% by using this technology.

6. In principle the product only controls two controllable points of each battery core in a single module, the battery pack module composed of four battery cores connected in series include eight controllable points which are independent in the module, then the reliability is very high, and the actually measured opening and closing life of the memory alloy reaches 120,000 times. By adding the product, in the future lithium-ion battery can be used as the traditional battery, the economic effect brought by simplifying the usage of users is very huge, massive social cost is reduced, and the product brings real overall popularization effect of the power lithium-ion battery on the aspects of automobiles, UPSs, power energy storage, field power utilization and the like.

7. As to the modularized lithium-ion battery, the limited battery energy is closed in the limited space, so that the safety is comprehensively improved. The battery safety accidents caused by abnormality can be effectively controlled within a controllable range.

The above description is merely the summary of the technical solution of the present invention. In order to understand the technical means of the present invention more clearly and implement the technical means according to the content of the specification, the present invention will be described in detail below in combination with preferred embodiments and accompanying drawings. The specific implementations of the present invention will be given by the following embodiments and accompanying drawings.

DETAILED DESCRIPTION OF THE EMBODIMENTS

The present invention will be described in detail below with reference to the accompanying drawings and in combination with embodiments.

A lithium-ion battery protector includes a broken-circuit protection switch arranged in a charging loop of a lithium-ion battery pack, wherein the broken-circuit protection switch is adapted to carry out the switching-on or switching-off of the charging loop of the lithium-ion battery pack via the shape change of a shape memory alloy therein at different temperatures. The shape memory alloy herein is preferably a nickel-titanium alloy. The broken-circuit protection switch generally protects two contacts arranged on two sides, and the contacts on the two sides are in contact at low-temperature shape and are disengaged when it comes to the memory temperature.

Figure 1:
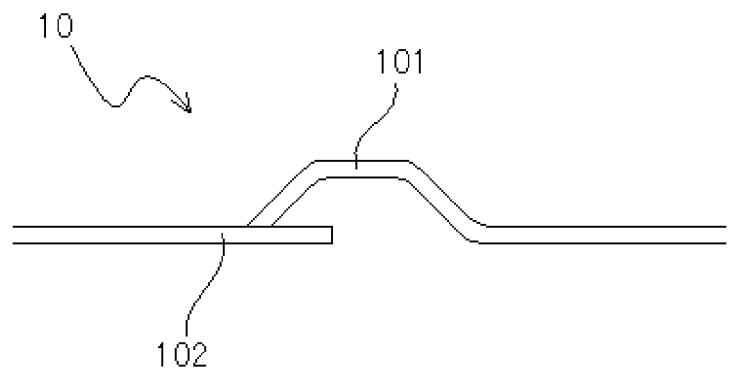
FIG. 1 is a schematic diagram of a contact structure of a broken-circuit protection switch in an embodiment of a lithium-ion battery protector of the present invention at low-temperature shape.
Figure 2:
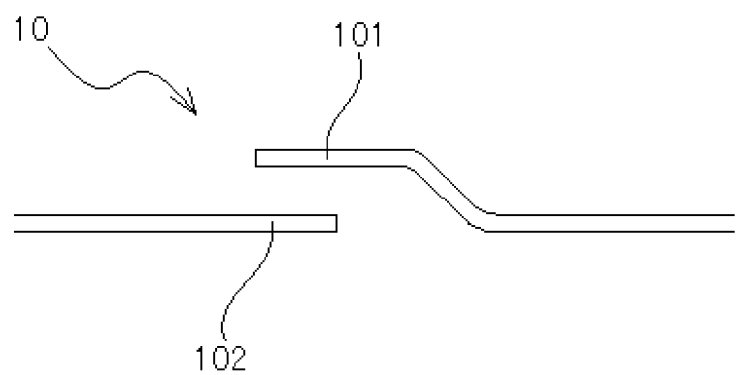
FIG. 2 is a schematic diagram of the contact structure of the broken-circuit protection switch in the embodiment of FIG. 1 at memory temperature.

FIG. 1 shows a schematic diagram of a contact structure of a broken-circuit protection switch in an embodiment of a lithium-ion battery protector of the present invention at low-temperature shape. In this embodiment, the broken-circuit protection switch 10 includes a movable contact end 101 and a static contact end 102, the movable contact end 101 is made of a shape memory alloy and is in contact with the static contact end 102 to conduct power in the charging loop at low-temperature shape, and when it comes to the memory temperature, as shown by the structure in FIG. 2, the movable contact end 101 restores the high-temperature shape and is disengaged from the static contact end 102 to cut off power in the charging loop.

Figure 3:
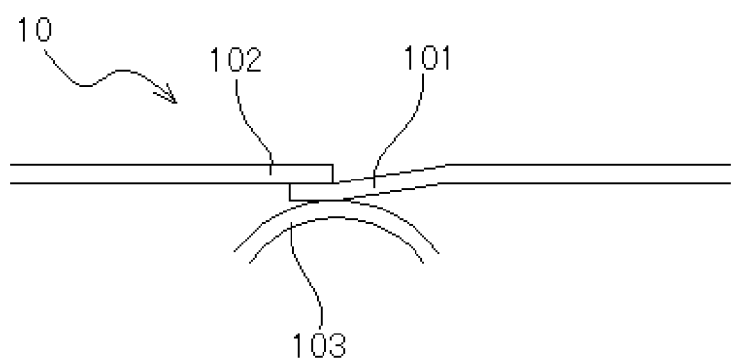
FIG. 3 is a schematic diagram of a contact structure of a broken-circuit protection switch in another embodiment of the lithium-ion battery protector of the present invention at low-temperature shape.
Figure 4:
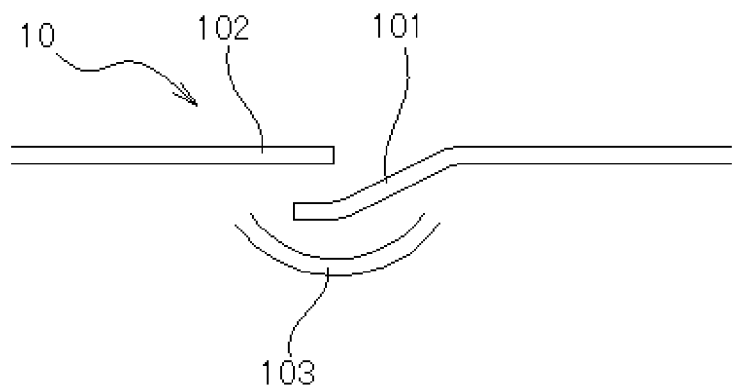
FIG. 4 is a schematic diagram of the contact structure of the broken-circuit protection switch in the embodiment of FIG. 3 at memory temperature.

FIG. 3 shows a schematic diagram of a contact structure of a broken-circuit protection switch in another embodiment of the lithium-ion battery protector of the present invention at low-temperature shape. In this embodiment, the broken-circuit protection switch 10 includes a movable contact end 101, a static contact end 102 and an elastic sheet 103, the elastic sheet 103 is made of a shape memory alloy, the elastic sheet 103 extends the movable contact end 101 to the static contact end 102 at low-temperature shape so that the movable contact end 101 is in contact with the static contact end 102 to conduct power in the charging loop, the movable contact end 101 is in a state of elastic deformation at the moment, and when it comes to the memory temperature and the elastic sheet 103 restores the high-temperature shape and no longer extends the movable contact end 101, the movable contact end 101 is restored under the action of elasticity and disengaged from the static contact end 102 to cut off power in the charging loop, as shown by the structure in FIG. 4.

It could be known from the structure of the broken-circuit protection switch in the above embodiments of the lithium-ion battery protector, when the broken-circuit protection switch is arranged in the charging loop of the lithium-ion battery pack, the charging loop of the lithium-ion battery pack can be switched on or off by changing the temperature of the broken-circuit protection switch. When the lithium-ion battery pack needs breakage protection during charging, the charging loop can be switched off by changing the temperature of the broken-circuit protection switch, so that the charging protection of the lithium-ion battery pack can be switched from electronic management to thermal management.

The present lithium battery system using a lot of complex electronic circuits such as local electric control units (LECUs), central electric control units (CECUs), microcontrollers (MCUs), and the like is difficult to overcome the following problems: the working current needs to flow through a circuit board, so the reliability is low; the switching device cannot bear abnormal impact of surge current; the cost is very high; the relay for power application in the main protection circuit is very expensive; the popularization of the power lithium battery is limited. The shape memory alloy for a physical switch does not have these problems, but has relatively high reliability; under some extremely abnormal conditions (e.g. abnormal high current and abnormal heating caused by abnormal back-flow of the parallel battery pack), the traditional battery protection circuit cannot act, whereas the broken-circuit protection switch of the present invention can carry out timely switching-off of the loop by controlling the temperature change. Moreover, the broken-circuit protection switch based on the characteristic of the shape memory alloy has self-restoration property; when the heat is dissipated and the temperature declines, the main circuit may be switched on by the memory characteristic and is continuously charged; therefore, such interrupted thermal management is careful for the protection of the battery.

Further, in combination with practical usage of the present invention, the surfaces of both the movable contact end 101 and the static contact end 102 can be silvered to carry out arc extinction, thus ensuring effective breakage in the deformation process.

The temperature change of the broken-circuit protection switch can be carried out by the current flowing through the broken-circuit protection switch. For example, the broken-circuit protection switch emits heat to switch off the loop in time under high current (abnormal short circuit). In view of the controllability of the temperature change, the temperature change is preferably carried out by a temperature control element outside the broken-circuit protection switch.

Figure 5:
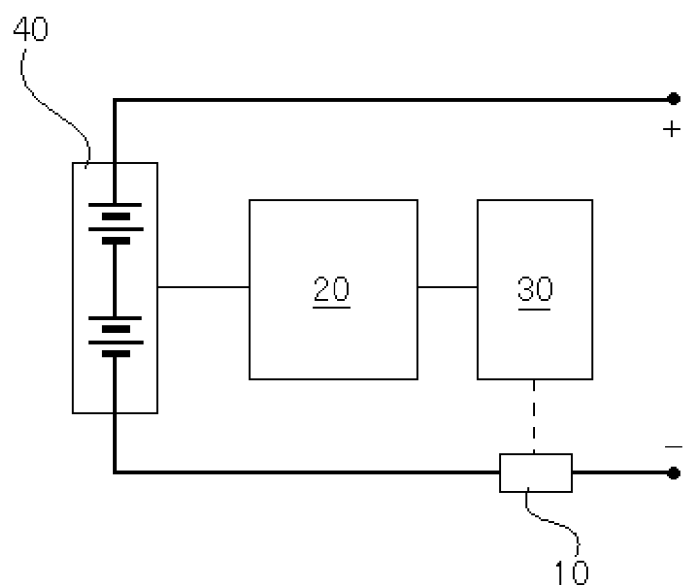
FIG. 5 is a schematic diagram of a connection relation among the monitoring and electro-thermal control circuit, the heater and the broken-circuit protection switch in the embodiment of the lithium-ion battery protector of the present invention.

As shown in FIG. 5, the lithium-ion battery protector further includes a monitoring and electro-thermal control circuit 20 and a heater 30, one end of the monitoring and electro-thermal control circuit 20 is connected with the lithium-ion battery pack 40, while the other end is connected with the heater 30, and the heater 30 is arranged on one side of the broken-circuit protection switch 10. The monitoring and electro-thermal control circuit 20 can monitor the lithium-ion battery pack 40 and control the heater 30 for heating the broken-circuit protection switch 10 according to the monitoring condition.

The heater 30 is a ceramic heater including a primary ceramic heater PTC and an auxiliary ceramic heater NTC. The primary ceramic heater PTC has the characteristic that the internal resistance is increased when the temperature continually rises. The primary ceramic heater PTC cooperates with the NTC to keep a substantially constant ampere-level load. The load acquires about 12v voltage of the whole module for working, so as to effectively suppress quick rise of the voltage due to over-charging when the whole battery pack is charged. When multiple groups of modules connected in series work, the high voltage module is waiting via suppression, while the low voltage module rises to approach the high voltage module so that it comes to the overall voltage. This is the basis of random series-parallel connection of the modules, and the modularized battery pack can simplify a lot of monitoring cost and improve the application reliability and safety.

The auxiliary ceramic heater NTC has the characteristic that the internal resistance is continually reduced when the temperature continually rises; besides providing auxiliary heat for the broken-circuit protection switch, this device practically acquires the voltage of the battery core with highest voltage in the four serial modular batteries for discharging, thus balancing the consistency of the modular battery pack (in view of the level of domestic battery cores at present, the consistency and the performance of the battery cores in the pack generally decline due to tiny difference of self discharge after the battery is used for one year), and keeping the state of the battery stable.

In other embodiments, the heater 30 may be other ones, such as a resistor heater, a transistor heater or the like.

Further, in combination with practical usage of the present invention, when monitoring a parameter (e.g. a voltage or current signal, etc.) for breakage protection of the lithium-ion battery pack 40, the monitoring and electro-thermal control circuit 20 controls the heater 30 to heat, so that the broken-circuit protection switch 10 on one side comes to the memory temperature. Wherein, the control current of the monitoring and electro-thermal control circuit 20 can come from the balance current of the lithium-ion battery, which is equivalent to utilizing the redundant energy of the lithium-ion battery and implementing the repair operation of the battery.

In combination with a preferred implementation of the present invention, when monitoring a parameter for breakage protection, the monitoring and electro-thermal control circuit 20 can drive the heater 30 to heat by using a battery core with relatively high voltage in the lithium-ion battery pack 40, so that the broken-circuit protection switch 10 on one side comes to the memory temperature and the problem of consistency deviation of the battery is actively solved.

Figure 6:
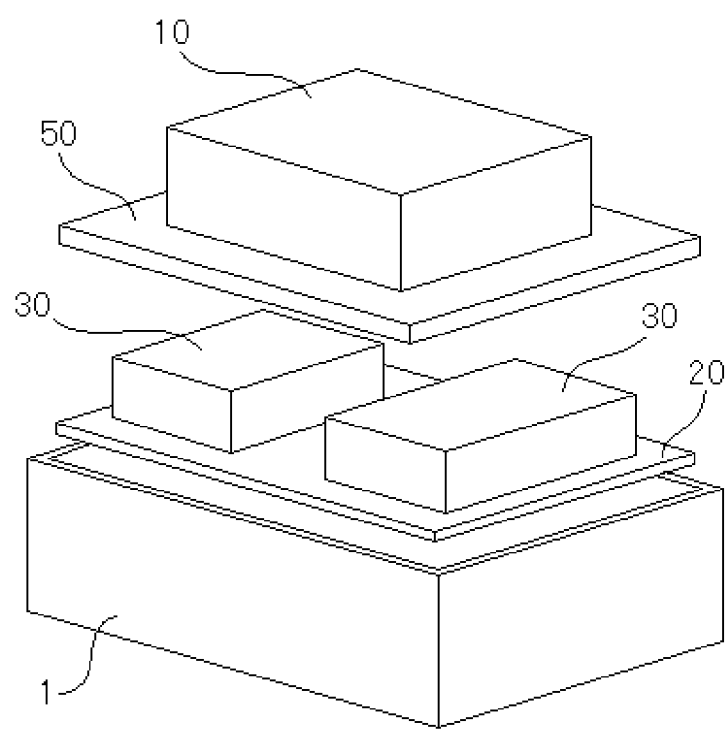
FIG. 6 is an overall exploded view of the embodiment of the lithium-ion battery protector of the present invention.

Referring to FIG. 6, the broken-circuit protection switch 10 is provided on an aluminum base 50 in order to prevent the interference of the external environment, and the heater 30 and the monitoring and electro-thermal control circuit 20 are arranged below the base 50. The base 50 is preferably made of aluminum, because aluminum has good heat conductivity and the cost of aluminum is suitable for large-scale manufacturing.

The broken-circuit protection switch 10, the base 50, the heater 30 and the monitoring and electro-thermal control circuit 20 can be all arranged in a shell 1 to form a standard module, and customers can design the stacking application as required. In addition, the shell 1 can gather heat, thus realizing a better heating effect.

It can be seen through the above literal description and in combination with the accompanying drawings, that after the present invention is adopted, the complex protection system of the lithium-ion battery is simplified by using the memorability, interference resistance, high voltage resistance and passive over-current capacity of the shape memory alloy; the battery is modularized to overcome the existing defects of short service life, poor stability, weak interference resistance, weak high voltage resistance and the like of an electronic semiconductor switch (e.g. MOSFET); and the problem of safety of the lithium-ion battery is effectively solved.

The metal structure with weak impedance directly acts on the lithium-ion battery module with limited voltage, so that random series-parallel connection usage under the lithium-ion battery module is really carried out. Safety and usage simplicity are combined into a whole.

The existing cost of the power lithium-ion battery can be directly reduced by over 40% by using this technology.

The product only controls eight controllable points of a single module in principle, and the controllable points are independent in the module, then the reliability is very high, and the actually measured opening and closing life of the memory alloy reaches 120,000 times. By adding the product, the future lithium-ion battery can be used as the traditional battery, the economic effect brought by simplifying the usage of users is very huge, massive social cost is reduced, and the product brings real overall popularization effect of the power lithium-ion battery on the aspects of automobiles, UPSs, power energy storage, field power utilization and the like.

As to the modularized lithium-ion battery, the limited battery energy is closed in the limited space, so that the safety is comprehensively improved. The battery safety accidents caused by abnormality can be effectively controlled within a controllable range.

The above descriptions are merely preferred embodiments of the present invention, but the present invention is not limited thereto. Various modifications and variations may be made for those skilled in the art, and any modification, equivalent substitution, improvement and the like made within the spirit and principle of the present invention shall fall into the protection scope of the present invention.

The invention claimed is:

1. A lithium-ion battery protector, comprising:
   a broken-circuit protection switch arranged in a charging loop of a lithium-ion battery pack,
   wherein the broken-circuit protection switch is adapted to carry out a switching-on or a switching-off of the charging loop of the lithium-ion battery pack,
   wherein the broken-circuit protection switch including a shape memory alloy,
   wherein the switching-on or the switching-off is caused by a shape change of the shape memory alloy at different temperatures, and
   a monitoring and electrothermal control circuit and a heater coupled to one side of the broken-circuit protection switch, wherein the monitoring and electrothermal control circuit is electrically connected with the heater to monitor the lithium-ion battery pack and control the heater for heating the broken-circuit protection switch in accordance with a monitoring condition,
   wherein the heater is a ceramic heater comprising a primary ceramic heater and an auxiliary ceramic heater, and wherein the primary ceramic heater cooperates with the auxiliary ceramic heater to keep a substantially constant ampere-level load during operation of the primary ceramic heater and the auxiliary ceramic heater.

2. The lithium-ion battery protector of claim 1, wherein the broken-circuit protection switch comprises:
   a movable contact end and a static contact end, the movable contact end made of the shape memory alloy,
   wherein the movable contact end is in contact with the static contact end to conduct power in the charging loop when the movable contact end comprises a low-temperature shape,
   wherein the movable contact end is disengaged from the static contact end to cut off power in the charging loop when the movable contact end comprises a high-temperature shape, and
   wherein the movable contact end is configured to transition from the low-temperature shape to the high-temperature shape when the movable contact end comes to a memory temperature.

3. The lithium-ion battery protector of claim 2, wherein the surfaces of the movable contact end and the static contact end are silvered.

4. The lithium-ion battery protector of claim 1, wherein the broken-circuit protection switch comprises a movable contact end, a static contact end, and an elastic sheet,
   wherein the elastic sheet is made of the shape memory alloy,
   wherein the elastic sheet is configured to extend the movable contact end to the static contact end at a low-temperature shape so that the movable contact end is in contact with the static contact end to conduct power in the charging loop,
   wherein when at a high-temperature shape, the elastic sheet is configured to disengage the movable contact end from the static contact end to cut off power in the charging loop, and
   wherein the elastic sheet to transition from the low-temperature shape to the high-temperature shape when the elastic sheet comes to a memory temperature.

5. The lithium-ion battery protector of claim 4, wherein the surfaces of both the movable contact end and the static contact end are silvered.

6. The lithium-ion battery protector of claim 1, comprising an aluminum base, wherein the broken-circuit protection switch is provided on the aluminum base, and the heater is arranged below the aluminum base.

7. The lithium-ion battery protector of claim 6, comprising a shell, wherein the broken-circuit protection switch, the base, the heater and the monitoring and electro-thermal control circuit are all disposed in the shell.

8. The lithium-ion battery protector of claim 1, wherein the monitoring and electro-thermal control circuit is configured to, when monitoring a parameter for breakage protection of the lithium-ion battery pack, control the heater so that the broken-circuit protection switch comes to a memory temperature.

9. The lithium-ion battery protector of claim 8, comprising an aluminum base, wherein the broken-circuit protection switch is provided on the aluminum base, and the heater is arranged below the aluminum base.

10. The lithium-ion battery protector of claim 9, comprising a shell, wherein the broken-circuit protection switch, the base, the heater and the monitoring and electro-thermal control circuit are all disposed in the shell.

11. The lithium-ion battery protector of claim 8, wherein the monitoring and electro-thermal control circuit is configured to, when monitoring a parameter for breakage protection of the lithium-ion battery pack, initiate the heater to heat the broken-circuit protection switch by using a battery core with relatively high voltage in the lithium-ion battery pack so that the broken-circuit protection switch comes to the memory temperature.

12. The lithium-ion battery protector of claim 11, comprising an aluminum base, the broken-circuit protection switch provided on the aluminum base, and the heater arranged below the aluminum base.

13. The lithium-ion battery protector of claim 12, comprising a shell, wherein the broken-circuit protection switch, the base, the heater and the monitoring and electro-thermal control circuit are all disposed in the shell.

* * * * *